US00RE37009E

(19) United States
(12) Reissued Patent
Diesch

(10) Patent Number: US RE37,009 E
(45) Date of Reissued Patent: Jan. 9, 2001

(54) ENHANCED TUBULAR HEAT EXCHANGER

(75) Inventor: Mark A. Diesch, Antioch, TN (US)

(73) Assignee: International Comfort Products Corporation (USA), Nashville, TN (US)

(21) Appl. No.: 08/354,624

(22) Filed: Dec. 13, 1994

Related U.S. Patent Documents

Reissue of:
(64) Patent No.: 5,094,224
Issued: Mar. 10, 1992
Appl. No.: 08/661,493
Filed: Feb. 26, 1991

(51) Int. Cl.[7] ..... A47J 27/00; F24H 3/08
(52) U.S. Cl. ..... 126/391.1; 126/110 R; 126/392; 126/99 R; 237/53; 165/153
(58) Field of Search ..... 126/391, 110 B, 126/91 R, 110 D, 92 R, 91 A, 366, 367, 368, 369, 373, 374, 375, 390, 392, 99 R, 110 R; 165/153; 237/53

(56) References Cited

U.S. PATENT DOCUMENTS

| | | |
|---|---|---|
| 1,789,591 | 1/1931 | McIntyre . |
| 2,016,720 | 10/1935 | Krause . |
| 2,113,607 | 4/1938 | Upton . |
| 2,347,957 | 5/1944 | McCullough . |
| 2,359,288 | 10/1944 | Brinen . |
| 2,618,256 | 11/1952 | Olson . |
| 2,641,206 | 6/1953 | Stout . |
| 2,663,321 | 12/1953 | Jantsch . |
| 2,852,042 | 9/1958 | Lynn . |
| 2,864,405 | 12/1958 | Young . |
| 3,596,495 | 8/1971 | Huggins . |
| 4,014,962 | 3/1977 | del Notario . |
| 4,044,796 | 8/1977 | Smick . |
| 4,202,493 | 5/1980 | Franchina . |
| 4,275,785 | 6/1981 | Kerivan . |
| 4,332,294 | 6/1982 | Drefahl et al. . |
| 4,352,378 | 10/1982 | Bergmann et al. . |
| 4,470,452 | 9/1984 | Rhodes . |
| 4,537,178 | 8/1985 | Hwang et al. . |
| 4,567,943 | 2/1986 | Longsworth et al. . |
| 4,577,681 | 3/1986 | Hughes . |
| 4,690,211 | 9/1987 | Kuwahara et al. . |
| 4,715,436 | 12/1987 | Takahashi et al. . |
| 4,727,907 | 3/1988 | Duncan . |
| 4,739,746 | 4/1988 | Tomlinson . |
| 4,823,865 | 4/1989 | Hughes . |
| 4,858,592 | 8/1989 | Hayek et al. . |
| 4,895,137 | 1/1990 | Jones et al. . |
| 4,922,890 | 5/1990 | Narang . |

FOREIGN PATENT DOCUMENTS

| | | |
|---|---|---|
| 516213 | 12/1952 | (BE) . |
| 3413999 | 7/1985 | (DE) . |

OTHER PUBLICATIONS

Borg–Warner, Oil Fired Furnaces, brochure.
W.M. Kays & A.L. London, Compact Heat Exchangers, 1964.

*Primary Examiner*—Weilun Lo
(74) *Attorney, Agent, or Firm*—Baker & Daniels

(57) ABSTRACT

The present invention is an enhanced tubular heat exchanger for a furnace *with the heat tubes of the heat exchanger having two straight sections connected by a bend.* The tubes of the heat exchanger include an enhanced portion which has a smaller cross-sectional area than the flue portion, in the form of an elliptically shaped tube. The enhanced portion further includes turbulators to promote the heat exchange from the heated flue gases. Circulation of air around the exterior of the tubes is also facilitated because the enhanced portion is disposed at a small angle relative to the flue portion. A plurality of tubes are disposed within the heat exchanger so that the circulation air first flows over the enhanced portions then over and around the generally cylindrical portions. This lowers the initial pressure drop in the circulation air flow and thereby facilitates the circulation of and heat transfer to the air being heated.

23 Claims, 8 Drawing Sheets

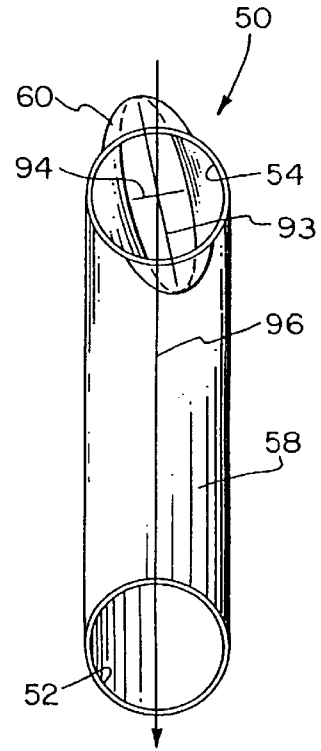
FIG. 19
AMENDED

ENHANCED TUBULAR HEAT EXCHANGER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to heat exchangers for furnaces. More specifically, the field of the invention is that of heat exchanger tubes which provide passageways for heated flue gases within furnace heat exchangers.

2. Prior Art

Tubular conduits are used in heat exchangers to provide an interior conduit for flue gases and exterior heat transfer surface for circulating air. The interior conduits may be formed from metallic clam-shell plates wherein two clam-shell plate surfaces are connected together to form the conduits, or the tubular conduits may comprise metal tubes. Within furnaces, such tubular conduits provide a passageway for flue gases, the heated products of combustion, which flow through the heat exchanger. The flue gas flow transfers heat to the material defining the passageway which then transfers the heat to air circulating over and around the heat exchanger.

The heat exchanger contains the flue gas flow. An inducer fan draws the combustion gases from a gas burner through the passageway to an exhaust system. The inducer fan insures that the heated flue gases are constantly flowing through the heat exchanger during the operation of the furnace, providing sufficient air for combustion. Also, a circulator fan is disposed adjacent the heat exchanger to drive a flow of circulation air over and around the tubular conduit and into the interior of the building being heated.

Typically, a furnace's heat exchanger tubular conduit contains one or more elongate portions which are disposed perpendicularly to the flow of circulation air. This arrangement allows the circulation air flow to impact on the exterior surfaces of the heat exchanger conduits to promote heat exchange. Also, the conduits generally include two or more elongated sections connected by bend sections so that the interior flow of heated flue gas is disrupted and impacts interior surfaces of the tubes to promote further heat exchange. However, a problem with prior art heat exchanger conduits involves the inefficiency in the amount of heat transferred from the heated flue gases to the circulating air.

Various structures exist which increase heat transfer efficiency. For example, one known configuration includes a plurality of indentations within the wall of the heat exchanger for disrupting the flow over the indentations. A problem with this configuration is that although disruption is caused within the flow along the inner surfaces of the wall, the flow in the center may only be minimally effected. Another known configuration includes tubes which have curved or polygonal walls varying in cross-sectional shape over the length of the tube. A problem with this configuration is the expense involved in manufacturing tubes which vary in cross-sectional shape over their length.

Inlets and outlets of the heat exchanger conduits are attached to a heat exchanger panel so that the burners, inducer and circulator fans, and the exhaust system can be conveniently attached to the heat exchanger. The heat exchanger conduits are disposed within the heat exchanger and arranged so that the circulator fan drives air over the conduits. For the clam-shell configuration, the plates are disposed generally perpendicularly to the direction of circulation air flow. The problem with the clam-shell configuration is that the flow produced by the circulator fan is only minimally disrupted in the spaces between the plates. For the tubular configuration, generally cylindrical elongated portions of the tubes may be disposed so that a direct line of sight is blocked along the direction of circulation flow. A problem with the tubular configuration is that the first row of cylindrical elongated portions causes a high pressure drop in the circulation flow resulting in the circulation flow only minimally wrapping around the other row or rows of elongated portions so that hot spots develop on the downstream elongated portions. Also, a relatively large circulation fan must be used to provide a sufficiently strong flow of circulation air following the high pressure drop.

What is needed is a heat exchanger element which more efficiently transfers heat from the heated flue gases to the circulation air.

Another need is for a heat exchanger element in which the flow in the center of the conduit is more effectively disrupted.

A further need is for such a heat exchanger element which is less expensive to manufacture.

A still further need is for a heat exchanger conduit for a furnace which promotes circulation air flow around the exterior of the conduit and minimizes the occurrence of hot spots.

Also needed is a heat exchanger conduit for a furnace which reduce the pressure drop of the circulation air across the heat exchanger conduits.

SUMMARY OF THE INVENTION

The present invention is a heat exchanger tube which includes an enhanced portion which is narrowed to have a smaller cross-sectional area than the cylindrical flue portion of the tube. The enhanced portion promotes heat transfer by accelerating and disrupting the flow of the flue gases. Also, the heat transfer properties of the present invention are improved by increasing the amount of internal heat transfer surface in comparison to total volume in the enhanced portion.

To further improve the efficiency of heat transfer, the enhanced portion includes turbulators for disrupting and radially mixing the heated flue gases which flow within the tube. The turbulators may take the form of indentations formed on the sides of the tube, or as an insert shaped and positioned in the tube to effect most of the flow.

A bend portion of the tube joins the flue and enhanced portions, and decreases in cross-sectional area from the flue portion to the enhanced portion. This gradual narrowing of the bend portion accelerates the heated flue gas flow so that it strikes the turbulators at a greater velocity.

For improving the flow characteristics of the circulating air around the exterior of the tube, the enhanced portion has a relatively thin width. This narrow profile allows circulation air to pass around the enhanced portion with a relatively small pressure drop which provides a more complete heat transfer at the outer surfaces of the flue portion.

The enhanced portion has a generally elliptical shape and has a major axis disposed at a slight angle relative to the plane defined by the central axes of the flue and enhanced portions. Within the casing of the heat exchanger, the tubes are positioned side by side and angled slightly from the vertical plane. Disposed in this manner, the major axes and therefore the exterior surfaces of the enhanced portions are generally parallel to the flow direction of the circulating air and the enhanced portions do not block direct flow to the exterior of the generally cylindrical flue portions. This arrangement decreases the pressure drop in the circulating air as it passes over the enhanced portion. The resulting flow over the flue portion transfers more of the exterior of the flue portion and thereby lessens the chance of developing hot spots.

The present invention provides improved heat transfer characteristics by shaping the tubular heat exchanger to increase heat transfer internally and externally. Internally, the heated flue gases are accelerated by the narrowing of the enhanced portion, and the enhanced portion has a greater ratio of surface area to internal volume which increases heat transfer efficiency. Externally, the circulation air is provided a flow path which decreases the initial pressure drop after passing over the enhanced portion and increases the scraping of the flue portion so that the circulation air absorbs more heat and hot spots do not develop on the heat exchanger.

The present invention is, in one form, a heat exchanger element in a furnace including a burner, an exhaust system, and a heat exchanger defining an internal air circulation area. The heat exchanger element is in the form of an elongated tube and comprises an inlet, an outlet, a flue portion, and an enhanced portion. The inlet is operably connected to the burner. The outlet is operably connected to the exhaust system. The flue portion is located adjacent to the inlet and is adapted to receive heated flue gas. The enhanced portion is located adjacent to the outlet and is adapted to expel the heated flue gas. The enhanced portion is narrowed and has a smaller cross-sectional area than the cross-sectional area of the flue portion. Also, the enhanced portion further includes means for disrupting and radially mixing the heated flue gases whereby the enhanced portion accelerates the heated flue gases and the turbulating means disrupts and radially mixes the heated flue gases within the enhanced portion.

One object of the present invention is to provide a heat exchanger element which more efficiently transfers heat from the heated flue gases to the circulation air.

Another object is to provide a heat exchanger element in which the laminar flow in the center of the conduit is more effectively disrupted and radially mixed.

A further object is to provide a heat exchanger element which is less expensive to manufacture.

A still further object is to provide a heat exchanger conduit for a furnace which promotes circulation air flow around the exterior of the conduit and minimizes the occurrence of hot spots.

Also an object of the present invention is to provide a heat exchanger conduit for a furnace which reduces the pressure drop across the heat exchanger conduits.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIGS. 18 and 19 are perspective views of a second embodiment of the enhanced heat exchanger tube.

Figure 1:
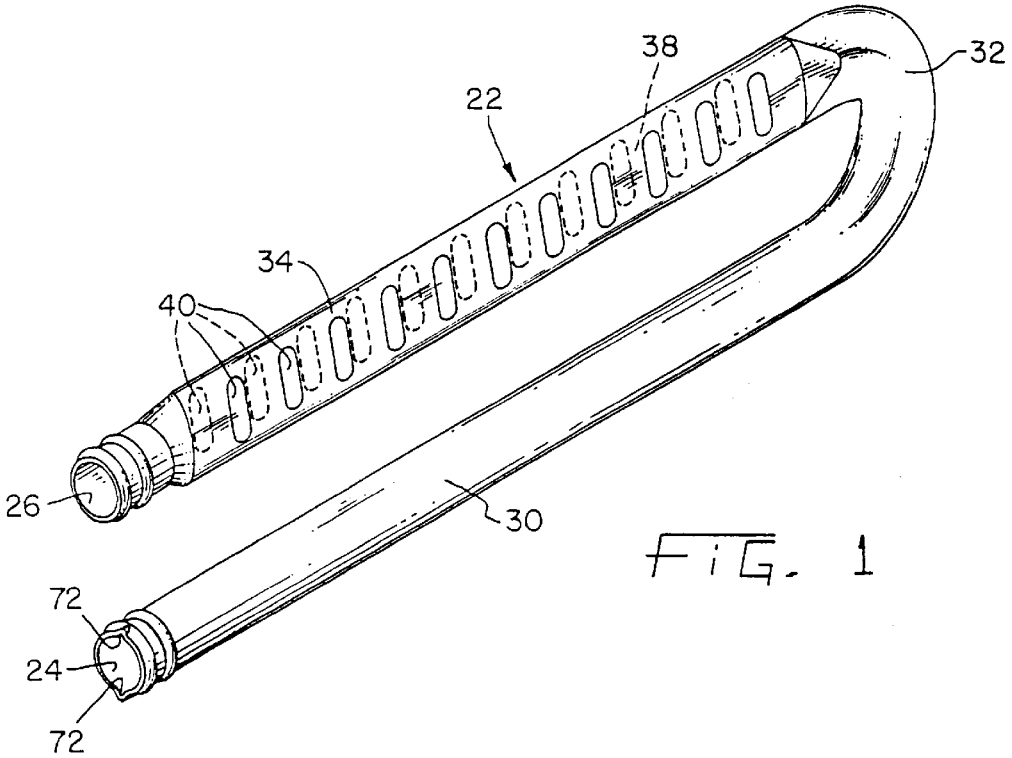
FIG. 1 is a perspective view of an enhanced heat exchanger tube of the present invention.

Corresponding reference characters indicate corresponding parts throughout the several views. The exemplification set out herein illustrates preferred embodiments of the invention, in several forms, and such exemplifications are not to be construed as limiting the scope of the invention in any manner.

DESCRIPTION OF THE PREFERRED EMBODIMENT

The present invention relates to an elongated heat exchanger tube 22 as depicted in FIG. 1. Tube 22 includes inlet 24 and outlet 26 for attaching to a heat exchanger panel 28 (see FIGS. 9 and 10). Connecting inlet 24 and outlet 26, tube 22 includes flue portion 30 which is adjacent to inlet 24, bend portion 32 which is adjacent to flue portion 30, and enhanced portion 34 which is disposed between bend portion 32 and outlet 26. Flue portion 30 is generally cylindrical in shape and receives the flame which is produced by operation of inshot burner 36 (see FIG. 9).

Figure 4:
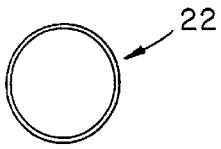
FIG. 4 is a cross-sectional view taken along view line 4—4 of FIG. 2.
Figure 5:
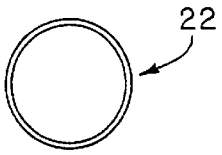
FIG. 5 is a cross-sectional view taken along view line 5—5 of FIG. 2.
Figure 6:
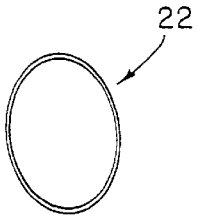
FIG. 6 is a cross-sectional view taken along view line 6—6 of FIG. 2.
Figure 7:
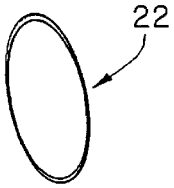
FIG. 7 is a cross-sectional view taken along view line 7—7 of FIG. 2.
Figure 8:
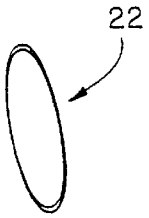
FIG. 8 is a cross-sectional view taken along view line 8—8 of FIG. 2.
Figure 2:
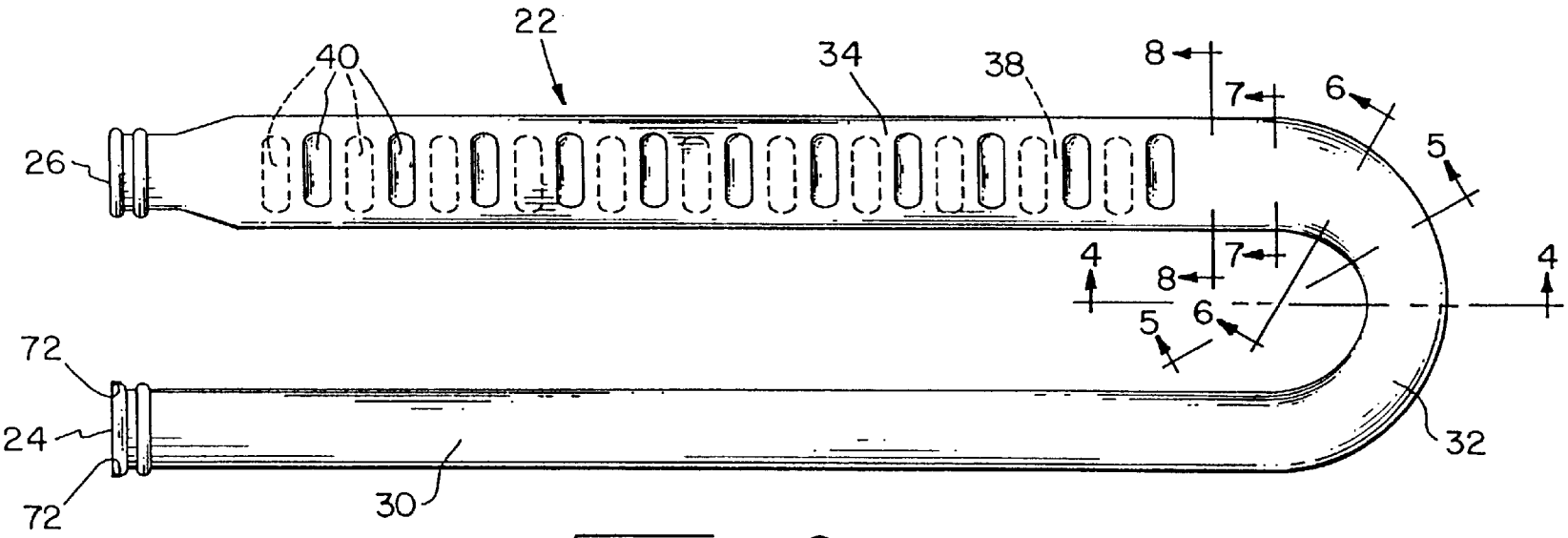
FIG. 2 is a side view of the enhanced heat exchanger tube of FIG. 1.
Figure 3:
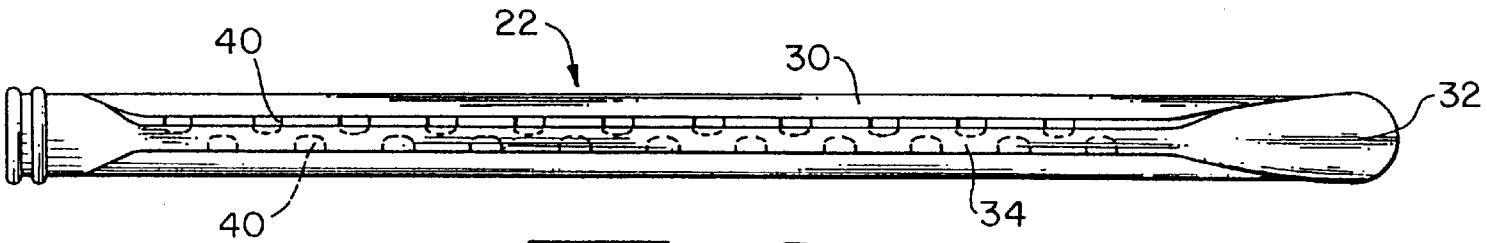
FIG. 3 is a top view of the enhanced heat exchanger tube of FIG. 1.

In accordance with the present invention, bend portion 32 decreases in cross-sectional area approaching enhanced portion 34, see FIGS. 2 and 4–8. Enhanced portion 34 is considerably narrower than flue portion 30, compare FIGS. 4 and 8 (although FIG. 4 shows a cross-section of bend portion 32, the depicted shape is representative of the general cross-sectional shape of flue portion 30). The narrowness of enhanced portion 34 provides a greater amount of interior surface area with respect to volume, and the maximum distance from an interior surface to any fluid flowing within enhanced portion 34 is less than the same maximum distance in flue portion 30. Thus, heat transfer is more efficient within enhanced portion 34 than within the generally cylindrical flue portion 30. Also, the narrowing of bend portion 32 towards enhanced portion 34 causes an increase in flow velocity within enhanced portion 34, which may be beneficial when using turbulators as described below.

The present invention further provides for disrupting and radially mixing the flow of flue gases within enhanced portion 34. Extending almost the distance of the major axis into flow passage 38 of enhanced portion 34, a series of indentations 40 are formed having a generally rounded rectangular shape which project inwardly about half the distance of the minor axis of the generally elliptically shaped enhanced portion 34. In the preferred embodiment, indentations 40 are formed alternately on opposite sides of enhanced portion 34 so that every pair of adjacent indentations 40 blocks substantially all direct flow within flow passage 38.

Figure 13:
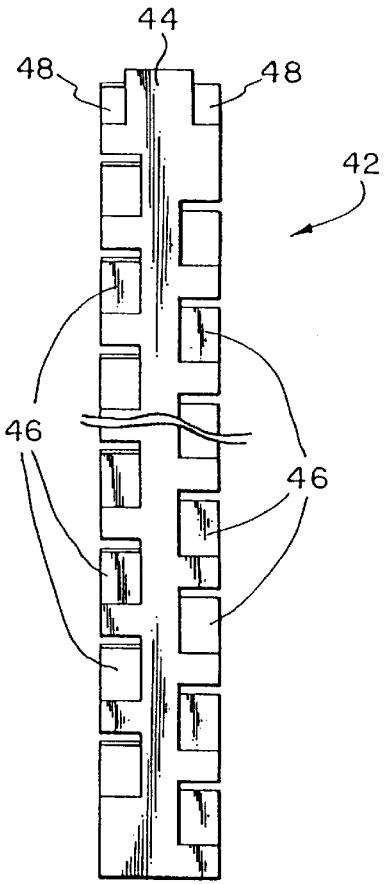
FIGS. 12 and 13 are perspective views of the outlet turbulator.
Figure 12:
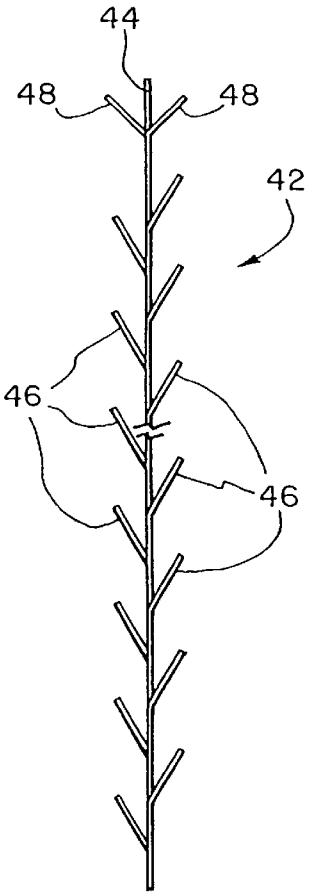

Outlet turbulator insert 42 may provide further enhancement to the disruption and radial mixing caused by indentions 40. As depicted in FIGS. 12 and 13, turbulator 42 includes elongate body 44 having a plurality of tabs 46 extending at an angle from body 44. At one end of body 44, a pair of flange portions 48 extend farther than tabs 46 and are adapted to engage outlet 26 in an interference fit after the rest of body 44 is received by enhanced portion 34. Preferably, tabs 46 are formed alternately on opposite sides of body 44 and in different directions with approximately the same spacing as indentations 40 along opposite sides of enhanced portion 34. In the exemplary embodiment, turbulator 42 is formed from a piece of aluminized steel having a thickness of approximately 0.81 mm.

Figure 18:
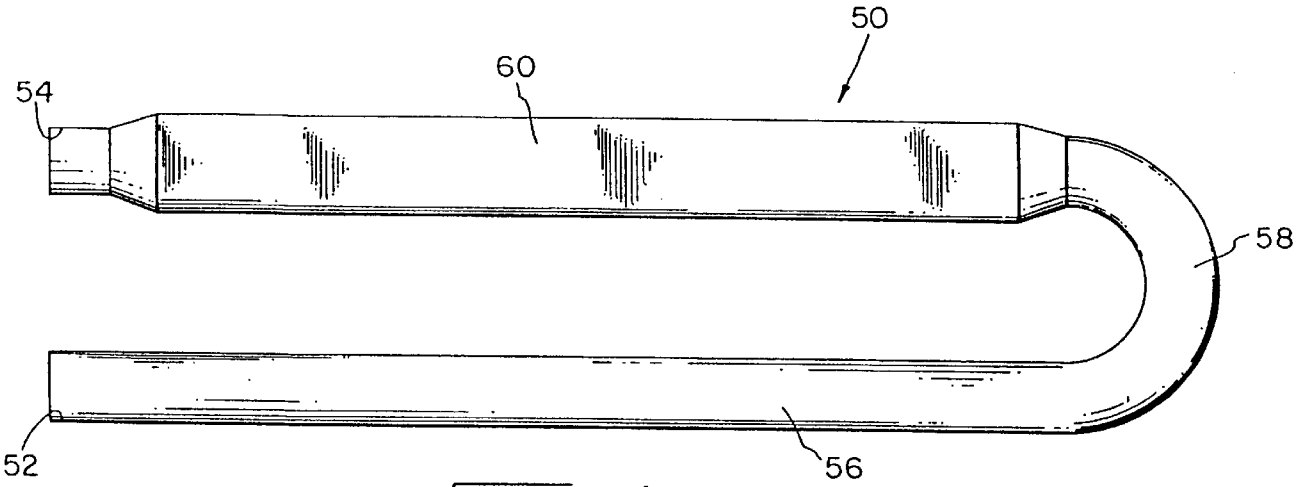

In an alternative embodiment of the present invention, heat exchanger tube 50 includes inlet 52 and outlet 54 for attaching to a heat exchanger panel (see FIGS. 18 and 19). Connecting inlet 52 and outlet 54, tube 50 includes flue portion 56 which is adjacent to inlet 52, bend portion 58 which is adjacent to flue portion 56, and enhanced portion 60 which is disposed between bend portion 58 and outlet 54. Flue portion 56 is generally cylindrical in shape and receives the flame which is produced by operation of an inshot burner. Enhanced portion 60 has a generally elliptical shape which is similar to enhanced portion 34 of FIG. 1, but without any indentations 40. In the absence of indentations 40, turbulator insert 42 is positioned within passageway 62 of enhanced portion 60 to disrupt and radially mix gaseous flow. The contour of bend portion 58 approaching enhanced portion 60 is similar to bend portion 32 of FIG. 1. Thus, the contour of enhanced portion 60 accelerates flow through bend portion 58, and insert 42 positioned within passageway 62 disrupts and radially mixes the accelerated flow.

Figure 17:
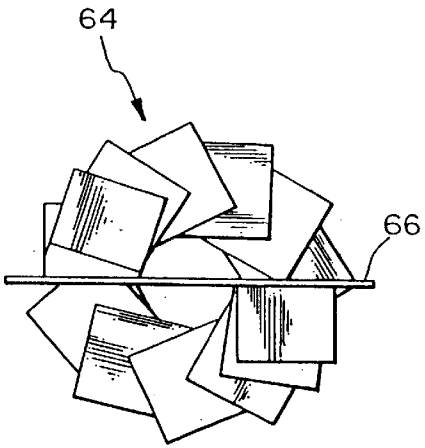
FIGS. 16 and 17 are perspective views of the turbulator of FIG. 12 after twisting.
Figure 16:
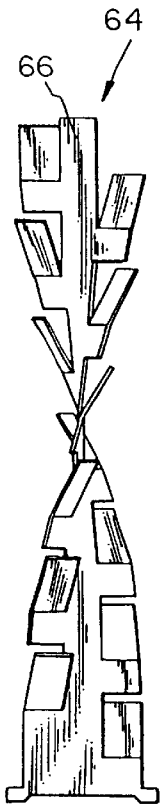
Figure 15:
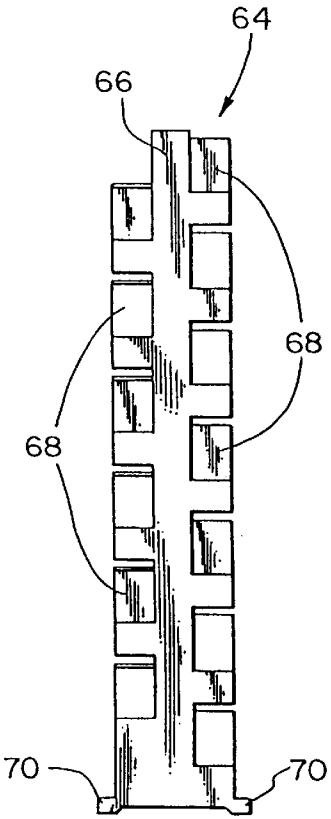
FIGS. 14 and 15 are perspective view of turbulator.
Figure 14:
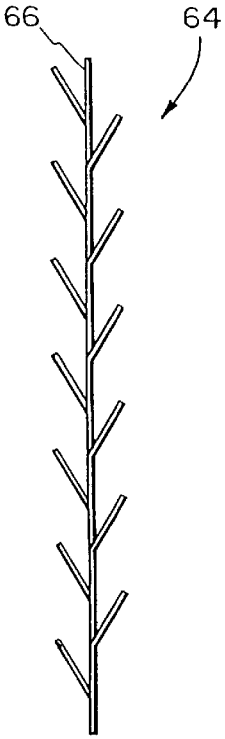

Inlet turbulator insert 64 is adapted to fit within inlet 52 for mixing combustion gases and quenching the flame to minimize $NO_x$ emissions. As shown in FIGS. 14 and 15, insert 64 includes elongate body 66 having a plurality of tabs 68 extending at an angle from body 66. At one end of body 66, a pair of foot portions 70 extend farther than tabs 68 and are adapted to engage recesses 72 of inlet 52 as described below. Preferably, tabs 68 are formed alternately on opposite sides of body 66 and twisted by 180° to form the spiral or helical shape depicted in FIG. 16. FIG. 17 shows the view of insert 64 from the perspective of an incoming fluid flow, wherein most of the interior of flue portion 30 is blocked by spiral or helical insert 64. In the exemplary embodiment, insert 64 is formed from a piece of stainless steel having a thickness of approximately 0.91 mm.

Figure 11:
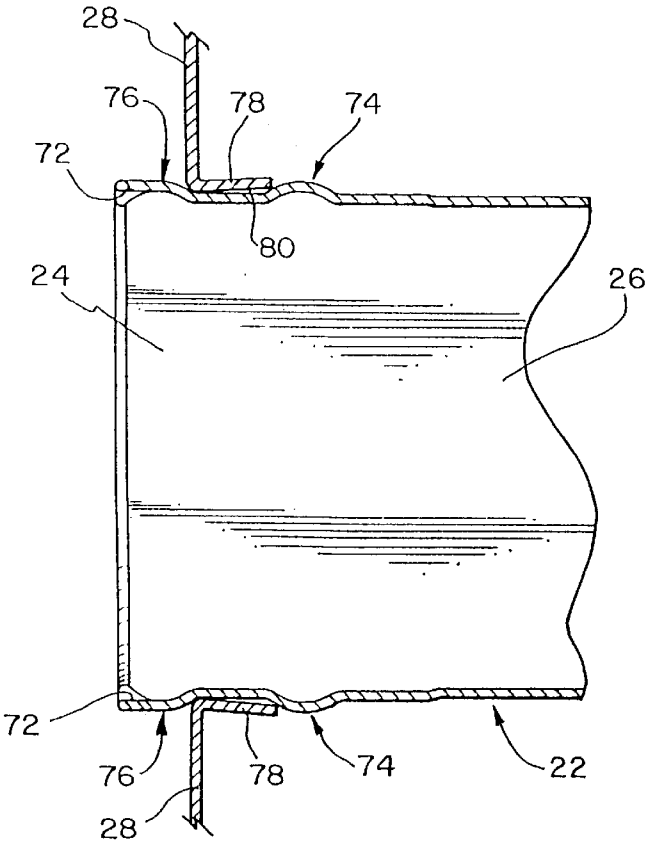
FIG. 11 is a side view, in cross-section, of an enhanced heat exchanger tube connected with the heat exchange plate.

Foot portions 70 secure insert 64 with inlet 24 and allow insert 64 to extend within flue portion 30. Recesses 72 are slotted to receive generally planar foot portions 70 without allowing any rotational movement. However, insert 64 can be easily inserted or removed from inlet 24 because no locking or interference fit is created by the attachment of inlet 24 to heat exchanger panel 28, see FIG. 11.

For attachment to panel 28, inlet 24 (and outlet 26) includes inner and outer ribs 74 and 76 disposed on opposite sides of flange 78 of panel 28. Attachment is accomplished by pressing inlet 24 (or outlet 26) through portal hole 80 until outer rib 74 is pushed through hole 80, but stopping before pushing through inner rib 76. In inlet 24, recess 72 is integrally formed with outer rib 74 so that after the attachment of tube 22 to panel 28, foot portions 70 may be located within recesses 72.

Figure 9:
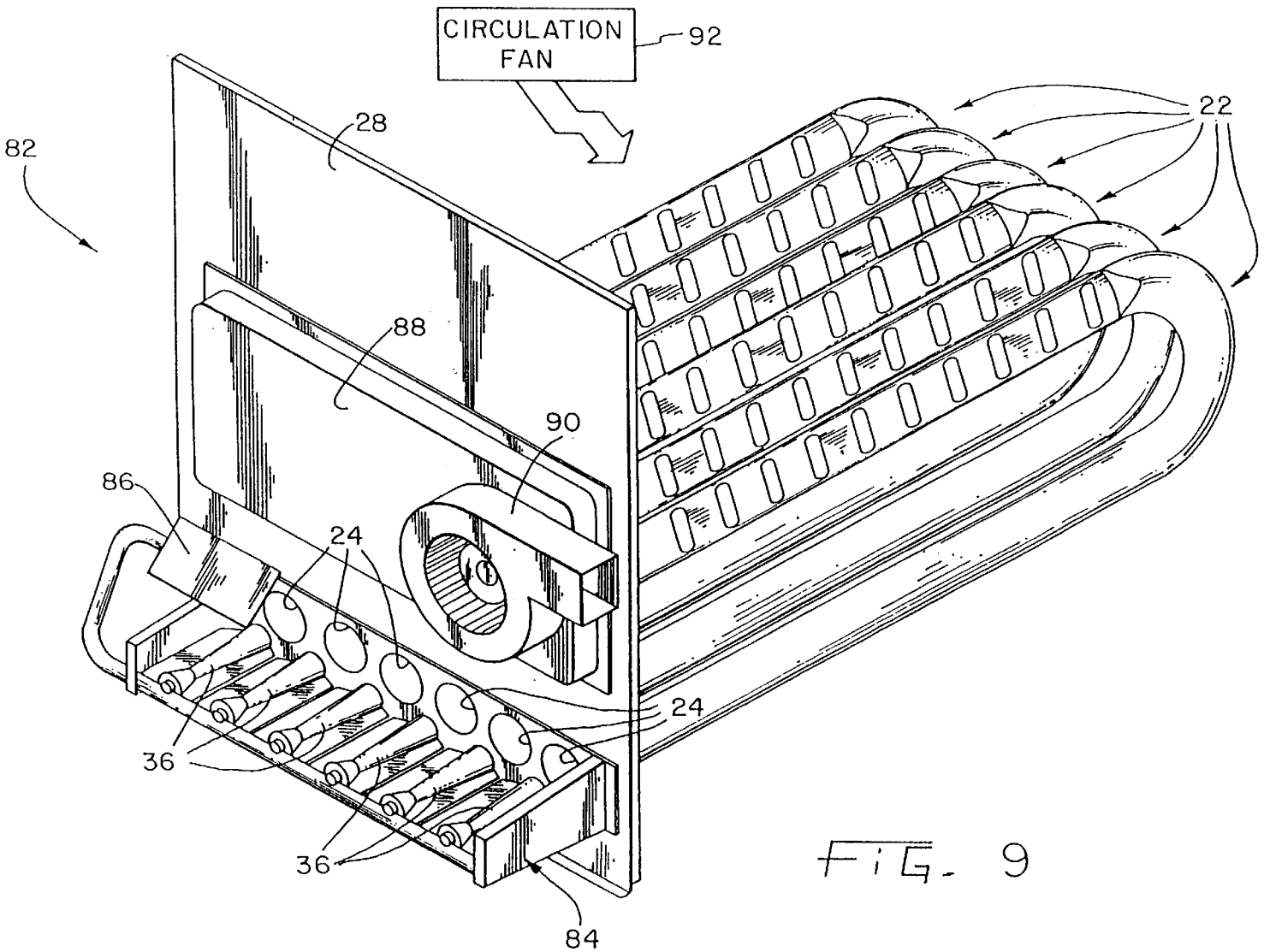
FIG. 9 is a perspective view of a heat exchanger assembly of the present invention.
Figure 10:
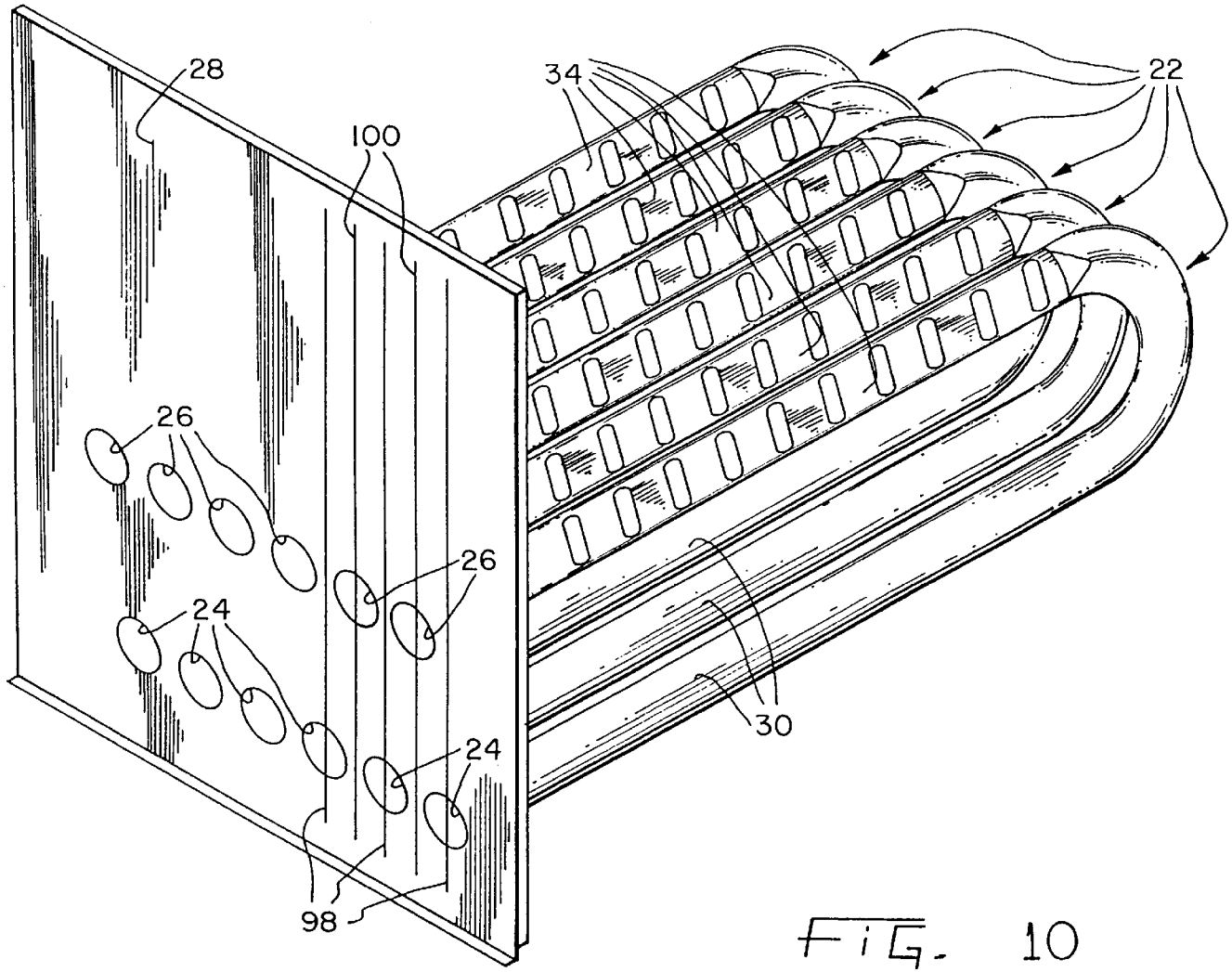
FIG. 10 is a perspective view showing only the heat exchanger plate and enhanced tubes of FIG. 9.

Tube 22 may be used within heat exchanger unit 82, see FIGS. 9 and 10. Also, for the purposes of the following discussion, tube 22 and tube 50 with insert 42 may be used interchangeably without significantly changing the flow over the external surfaces of the heat exchanger tubes. Tubes 22 are attached to panel 28 as disclosed above. Adjacent to inlets 24, mounting bracket 84 is secured to panel 28 and supports a plurality of inshot burners 36 and an ignitor unit 86. Adjacent to outlets 26 (not shown in FIG. 9) on panel 28, outlet manifold 88 is coupled to inducer blower 90 which is arranged to induce flow through tubes 22. In communication with tubes 22, circulation fan 92 is arranged to flow air through the plenum (not shown in FIGS. 9 or 10) of heat exchanger unit 82 which is partially defined by panel 28.

In accordance with the present invention, enhanced portion 34 (or 60) is disposed at an angle relative to the axial plane defined by the axes of enhanced portion 34 (or 60) and flue portion 30 (or 56). As best shown in FIG. 19, enhanced portion 60 (or 34) has a generally elliptical shape with a major axis 93 (preferably 82 mm) and a minor axis 94 (preferably 27 mm), with major axis 93 being disposed at about an 11.5 angle relative to axial plane 96 of tube 50. With this angular configuration, tubes 22 (or 50) have their inlets 24 (or 52) and outlets 26 (or 54) connected to panel 28 in an arrangement wherein vertical planes 98 which include the axis of flue portions 30 (or 56) are offset from vertical planes 100 which include the axis of enhanced portions 34 (or 60), see FIG. 10. In this manner, a vertical line through tubes 22 (or 50) is blocked by either the diameter of flue portion 30 (or 56) or by minor axis 94 of enhanced portion 34 (or 60).

In operation, when circulation fan 92 blows air over tubes 22 (or 50) in a direction generally parallel to major axis 93, and the flow experiences a relatively low pressure drop as it initially flows over enhanced portions 34 (or 60). Further, flue portions 30 (or 56) are not shielded by enhanced portions 34 (or 60), so that the full flow impacts on flue portions 30 (or 56) and tend to wrap around the cylindrical shape of flue portions 30 (or 56) to thereby provide a greater amount of heat exchange and minimize the occurrence of hot spots which are potentially damaging to tube 22. Also, the size of circulation fan 92 needed to achieve sufficient air flow over tubes 22 (or 50) is significantly smaller than the size needed to achieve sufficient air flow over cylindrically shaped flue portions 30 (or 56).

Figure 20:
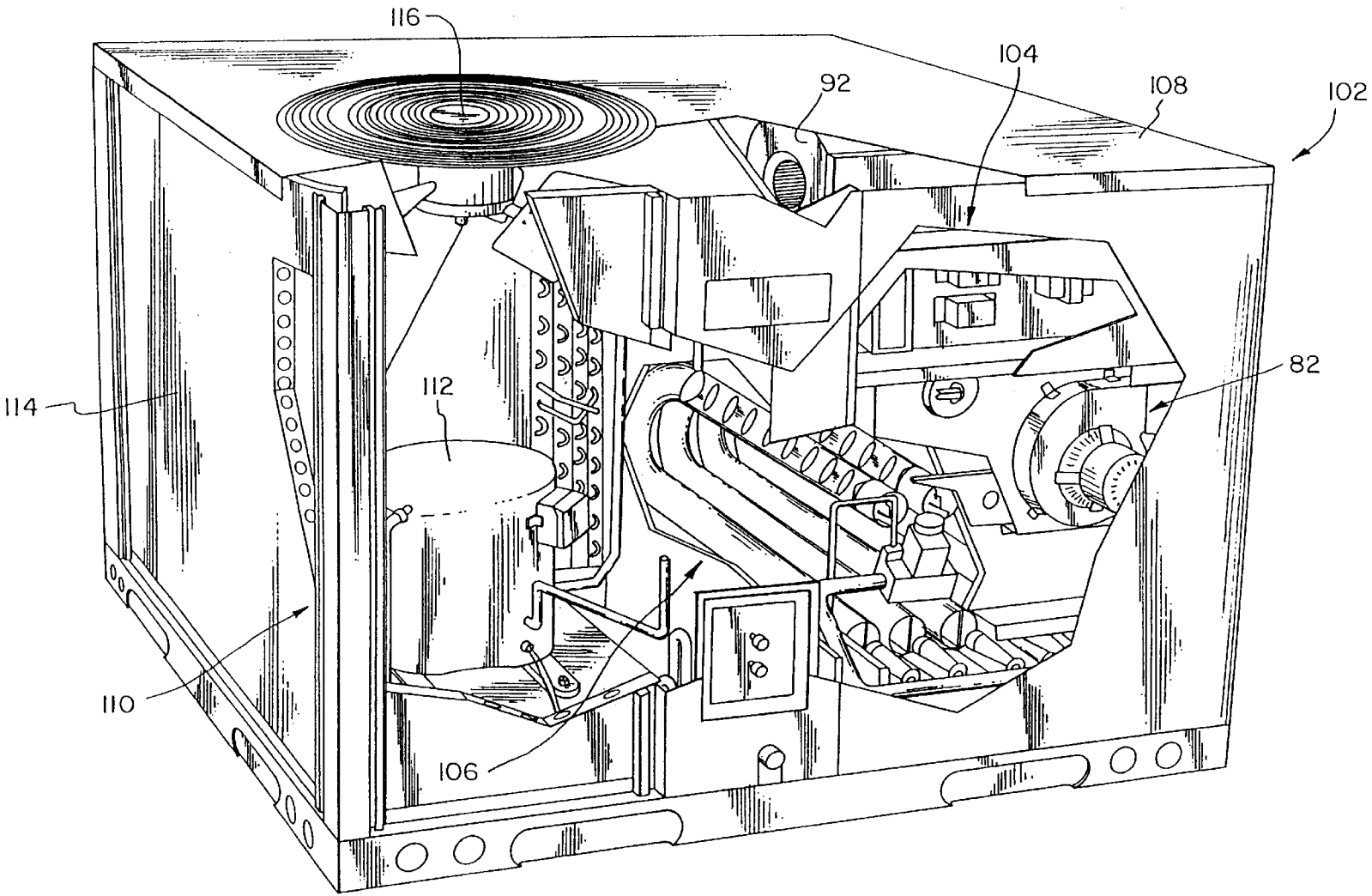
FIG. 20 is a perspective view of the heating/cooking unit.

FIG. 20 presents another application of tubes 22 (or 50) in temperature control unit 102. Furnace portion 104 of unit 102 includes heat exchanger unit 82 disposed within plenum 106. Located adjacently to furnace portion 104 within housing 108 is air conditioner portion 110 which includes compressor 112, coils 114, and centrifugal fan 116 which operate in a known manner. With the additional efficiency of tubes 22 (or 50) and the smaller sized circulation fan 92 required, furnace portion 104 is conveniently sized to occupy approximately the same amount of space within housing 108 as air conditioner portion 110, and provides a temperature control unit which is well adapted to be mounted on a roof top.

Tube 22 (or 50) is manufactured by starting with a straight metal tube having a diameter of approximately 57.15 mm which after bending has a hair-pin axial length of appropriately 952 mm, comprised of a material such as aluminized steel. The initial length of the straight metal tube depends on the manufacturing process used. The straight tube has inlet 24 (or 52) and outlet 26 (or 54) formed at the ends in a conventional manner, and is then bent 180° in a conventional manner. Enhanced portion 34 (or 60) is compressed conventionally, such as by brake press, to form the cross-sectional shape shown in FIG. 8. During the forming process of enhanced portion 34, indentations 40 may also be formed. Alternatively, or in combination with indentations, turbulator insert 42 may be inserted into enhanced portion 34 (or 60).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A heat exchanger element for use in a furnace including a burner, an exhaust system, and a heat exchanger having at least one heat exchanger element, said heat exchanger element comprising[;]*:* an elongated tube having [an inlet adapted to be operably connected to the burner, an outlet adapted to be operably connected to the exhaust system, a flue portion located adjacent to said inlet and adapted to receive heated flue gases, and an enhanced portion defined by a substantial axial portion of said elongated tube, said enhanced portion located adjacent to said outlet and adapted to expel said heated flue gases, said enhanced portion being generally flattened and thereby having a smaller cross-sectional area than the cross-sectional area of said flue portion] *a circular cross-section, said tube having first and second straight sections connected by a bend, said tube having an inlet adapted to be operably connected to the burner, an outlet adapted to be operably connected to the exhaust system, a flue portion including said first straight section and located adjacent to said inlet and adapted to receive said heated flue gases, and an enhanced portion including said second straight section and located adjacent to said outlet and adapted to expel said heated flue gases, said enhanced portion being generally flattened along a majority of its length and thereby having a smaller cross-sectional area than the cross-sectional area of said flue portion.*

2. The heat exchanger element according to claim 1 wherein said enhanced portion comprises a generally straight portion of the length of said heat exchanger element, which is connected to the remainder of the heat exchanger by a bend portion.

3. The heat exchanger element according to claim 1 wherein said enhanced portion includes a turbulating means for disrupting and radially mixing said heated flue gases to increase the heat transfer from heated flue gases within said enhanced portion.

4. The heat exchanger element according to claim 1 further comprising an inlet turbulator for quenching the flames of a burner, said inlet turbulator including a body extending within said flue portion and a plurality of tabs angularly extending from said body.

5. The heat exchanger element of claim 4 wherein said body has a spiral shape.

6. The heat exchanger element of claim 1 wherein said enhanced portion and said flue portion are connected by a bend portion, said bend portion including a transition portion which gradually decreases in cross-sectional area from said flue portion to said enhanced portion.

7. A furnace comprising:

a burner;

a casing defining a plenum;

a fan operably connected to said plenum; and at least one elongated tube disposed in said plenum, said tube [including a flue portion, an enhanced portion, an inlet operably connected to said burner, and an outlet, said flue and enhanced portions defining a passageway for a flow of heated flue gases from said inlet to said outlet, said tube being in fluid flow communication with said fan, said flue portion located adjacent to said inlet and adapted to receive said heated flue gases, said enhanced portion comprising a substantial axial portion of said elongated tube, said enhanced portion located adjacent to said outlet, said enhanced portion being generally flattened relative to said flue portion and having a smaller cross-sectional area than the cross-sectional area of said flue portion] *having first and second straight sections connected by a bend, and including a flue portion including said first straight section, and enhanced portion including said second straight section, an inlet operably connected to said burner, and an outlet, said flue portion and enhanced portion defining a passageway for a flow of heater flue gases from said inlet to said outlet, said tube being in fluid flow communication with said fan, said flue portion having a circular cross-section, said flue portion located adjacent to said inlet and adapted to receive said heated flue gases, said enhanced portion being generally flattened relative to said flue portion throughout its length, and having a smaller cross-sectional area than the cross-sectional area of said flue portion.*

8. The furnace of claim 7 further comprising an inlet turbulator for quenching the flames of said burner, said inlet turbulator including a body extending within said flue portion and a plurality of tabs angularly extending from said body.

9. The furnace of claim 8 wherein said body has a spiral shape.

10. The furnace of claim 7 wherein said elongated tube includes a bend portion connecting said enhanced portion and said flue portion, said bend portion having a shape which gradually decreases in cross-sectional area from said flue portion to said enhanced portion.

11. The furnace of claim 7 further comprising a circulation fan disposed adjacent said plenum and arranged to blow air sequentially over said enhanced portion and said flue portion, said enhanced portion having a cross-sectional elliptical shape which is disposed with the major axis defining a line which is generally parallel with the direction of air blown by said exhaust fan whereby said blown air experiences a relatively low pressure drop while passing over said enhanced portion and thereby does not shield said flue portion from said blown air.

12. The furnace of claim 7 further comprising an air conditioner unit mounted adjacent said casing.

13. The furnace according to claim 7 wherein said enhanced portion includes turbulating means for disrupting and radially mixing heated flue gases to increase heat transfer from said heated flue gases in said enhanced portion.

14. The furnace according to claim 7 wherein said enhanced portion comprises a generally straight portion of the length of said elongated tube, which is separated from the remainder of said elongated tube by a bend portion.

15. The furnace of claim 14 wherein said turbulating means includes a plurality of ribbed indentations formed in said enhanced portion to cause the flow of said heated flue gases through said enhanced portion to be nonlaminar.

16. The furnace of claim 14 wherein said turbulating means includes an insert positioned within the interior of said enhanced portion, said insert having an elongate body and a plurality of tab portions which extend at angles from said insert body, said tab portions causing the flow of heated flue gases through said enhanced portion to be nonlaminar.

17. The furnace of claim 13 wherein said turbulating means includes a plurality of indentations formed in said enhanced portion for causing the flow of said heated flue gases in said enhanced portion to be nonlaminar.

18. The furnace of claim 13 wherein said turbulating means includes an insert positioned within the interior of said enhanced portion, said insert having an elongate body and a plurality of tab portions which extend at angles from said insert body whereby said tab portions cause the flow of said heated flue gases in said enhanced portion to be nonlaminar.

19. A furnace comprising:

a burner;

a casing defining a plenum;

an exhaust fan operatively associated with said plenum;

a plurality of elongated tubes disposed in said plenum, each said tube [including an inlet operably connected to said burner, an outlet operably connected to said exhaust fan, a flue portion located adjacent to said inlet and adapted to receive heated flue gases from said burner, and an enhanced portion located adjacent to said outlet for expelling said heated flue gases, said enhanced portion comprising a substantial axial portion of said elongated tube] *having first and second straight sections connected by a bend, including an inlet operably connected to said burner, an outlet operably connected to said exhaust fan, a flue portion of circular cross-section, said flue portion including said first straight section and located adjacent to said inlet and adapted to receive heated flue gases from said burner, and an enhanced portion including said second straight section and located adjacent to said outlet for expelling said heated flue gases*, said enhanced portion being narrowed and having a smaller cross-sectional area than the cross-sectional area of said flue portion, said flue portion and enhanced portion of each *of* said tubes defining a communication passage for the flow of heated flue gases from said inlet to said outlet; and a circulation fan in communication with said plenum and arranged to cause a flow of air over said tubes in a first direction;

at least one said enhanced portion having a cross-sectional elliptical shape which is disposed with the major axis defining a line which is generally parallel with said first direction.

20. The furnace of claim 19 wherein the major axis of said at least one enhanced portion is disposed at about an 11.5° angle with respect to a plane which is defined by the axial center of said inlet and the axial center of said outlet.

21. The furnace of claim 19 wherein said tubes are spaced apart by approximately the sum of the diameter of said flue portion and the length of the minor axis of said at least one enhanced portion, and said plurality of tubes blocks direct flow of said air flow through said plenum.

22. The furnace of claim 19 further comprising an air conditioner unit mounted adjacently to said casing.

23. The furnace according to claim 19 wherein said enhanced portion comprises a generally straight portion of the length of each of said elongated tubes, each said enhanced portion being separated from the remainder of each said elongated tube by a bend portion.

* * * * *